United States Patent Office 3,105,849
Patented Oct. 1, 1963

3,105,849
BICYCLIC HYDRAZINIUM COMPOUNDS
Charles Ferdinand Huebner, Chatham, N.J., assignor to Ciba Corporation, a corporation of Delaware
No Drawing. Filed Feb. 1, 1960, Ser. No. 5,632
6 Claims. (Cl. 260—501)

The present invention relates to quaternary compounds, particularly to compounds of the formula:

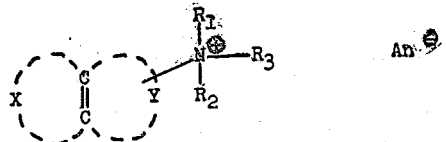

in which the radical of the formula:

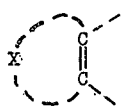

represents a carbocyclic arylene radical, Y stands for an alkylene (or polymethylene) radical containing from three to six carbon atoms in the alkylene (or polymethylene) chain, each of the radicals $R_1$ and $R_2$ stands for aliphatic hydrocarbon, substituted aliphatic hydrocarbon, carbocyclic aryl, carbocyclic aryl-aliphatic hydrocarbon, or, when taken together, for a divalent aliphatic radical, $R_3$ stands for one of the groups of the formula:

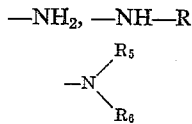

or

in which $R_4$ represents aliphatic hydrocarbon, substituted aliphatic hydrocarbon, carbocyclic aryl, carbocyclic aryl-aliphatic hydrocarbon or acyl, each of the radicals $R_5$ and $R_6$ represents aliphatic hydrocarbon, substituted aliphatic hydrocarbon, carbocyclic aryl, carbocyclic aryl-aliphatic hydrocarbon, or, when taken together, a divalent aliphatic radical, or one of the radicals $R_5$ and $R_6$ represents an acyl group and the other has the aforementioned meaning, $R_7$ stands for alkyliden, cycloalkylidene, cycloalkyl-alkylident, carbocyclic aryl-alkylidene or heterocyclic arylalkylidene, and An$^\ominus$ represents the anion of an acid.

A carbocyclic arylene radical is more especially a monocyclic carbocyclic arylene radical, e.g. 1,2-phenylene or substituted 1,2-phenylene radical, as well as a bicyclic carbocyclic arylene radical, e.g. 1,2-naphthylene, 2,3-naphthylene and the corresponding substituted naphthylene radicals.

One of more than one of the same or of different substituents may be attached to any of the positions of the 1,2-carbocyclic arylene radical available for substitution; suitable substituents are, for example, lower alkyl e.g. methyl, ethyl, n-propyl, isopropyl, n-butyl, isobutyl, secondary butyl, tertiary butyl, n-pentyl, neopentyl, and the like, functionally converted hydroxy, such as etherified hydroxy, particularly lower alkoxy, e.g. methoxy, ethoxy, n-propyloxy, isopropyloxy, n-butyloxy and the like, carbocyclic aryloxy, such as monocyclic carbocyclic aryloxy, e.g. phenyloxy or substituted phenyloxy, carbocyclic arylaliphatic hydrocarbonoxy, such as monocyclic carbocyclic aryl-lower alkoxy, e.g. benzyloxy or substituted benzyloxy and the like, or esterified hydroxy, such as lower alkoxycarbonyloxy, e.g. methoxycarbonyloxy, ethoxylcarbonyloxy and the like, lower alkanoyloxy, e.g. acetoxy, propionyloxy and the like, or halogeno, e.g. fluoro, chloro, bromo and the like, nitro, amino, especially N,N-di-substituted amino, such as N,N-di-lower alkyl-amino, e.g. N,N-dimethylamino, N,N-diethylamino and the like, etherified mercapto, such as lower alkyl-mercapto, e.g. methylmercapto, ethylmercapto and the like, halogeno-lower alkyl, e.g. trifluoromethyl and the like or any other suitable substituent.

The alkylene radical Y contains at least three, such as from three to six, especially from three to five, chain carbon atoms, and may therefore be represented by 1,3-propylene (1,3-trimethylene) or 1,4-butylene (1,4-tetramethylene), as well as 1,5-pentylene (1,5-pentamethylene), 1,6-hexylene (1,6-hexamethylene) and the like. Apart from containing the group of the formula:

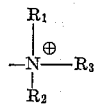

the carbon atoms of the alkylene radical Y may contain no other substituent or may be substituted by aliphatic hydrocarbon, such as lower alkyl, e.g. methyl, ethyl and the like, aliphatic hydrocarbon substituted by functional groups, carbocyclic aryl, such as monocyclic carbocyclic aryl, e.g. phenyl or substituted phenyl, carbocyclic arylaliphatic hydrocarbon, such as monocyclic carbocyclic aryl-lower alkyl, particularly phenyl-lower alkyl, e.g. benzyl, 1-phenylethyl, 2-phenylethyl and the like, or substituted phenyl-lower alkyl, or any other suitable substituent.

Each of the groups $R_1$ and $R_2$ attached to the substituent of the formula:

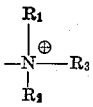

may stand for aliphatic hydrocarbon radicals, particularly lower alkyl, e.g. methyl, ethyl, n-propyl, isopropyl, n-butyl and the like, as well as lower alkyl substituted by functional groups, such as hydroxyl, etherified hydroxyl, for example, lower alkoxy, e.g. methoxy, ethoxy and the like, phenyl-lower alkoxy, e.g. benzyloxy and the like, esterified hydroxyl, for example, lower alkanoyloxy, e.g. acetyloxy, propionyloxy and the like, etherified mercapto, for example, lower alkyl-mercapto, e.g. methylmercapto, ethylmercapto and the like, phenyl-lower alkylmercapto, e.g. benzylmercapto, 1-phenylethylmercapto and the like, or any other functional group. Other aliphatic hydrocarbon radicals are, for example, lower alkenyl, particularly allylic lower alkenyl, e.g. allyl, 2-methyl-allyl and the like, cycloalkyl containing from three to eight, particularly from five to six, ring carbon atoms, e.g. cyclopentyl, cyclohexyl and the like, cycloalkenyl, containing from four to eight, particularly from five to six, ring carbon atoms, e.g. 3-pentenyl, 3-cyclohexenyl and the like, cycloalkyl-lower alkyl, in which cycloalkyl contains from three to eight, particularly from five to six, ring carbon atoms, e.g. cyclopentylmethyl, 1-cyclopentylethyl, 2-cyclopentylethyl, cyclohexylmethyl, 1-cyclohexylethyl, 2-cyclohexylethyl and the like, cycloalkenyl-lower alkyl, in which cycloalkenyl contains from four to eight, particularly from five to six, carbon atoms, e.g. 3-cyclopentenylmethyl, 2-(3-cyclopentenyl)-ethyl-3-cyclohexenylmethyl 1-(3-cyclohexenyl)-ethyl and the like, or any other aliphatic substituent.

Each of the groups $R_1$ and $R_2$ may also stand for carbocyclic aryl, particularly monocyclic carbocyclic aryl, e.g. phenyl or phenyl substituted as will be shown hereinbelow. $R_1$ and/or $R_2$ may also stand for carbocyclic arylaliphatic hydrocarbon, particularly monocyclic carbocyclic aryl-lower alkyl, such as phenyl-lower alkyl, e.g. benzyl, 1-phenylethyl, 2-phenylethyl and the like and substituted phenyl-lower alkyl. Substituted carbocyclic aryl, e.g. phenyl, radicals may contain as substituents lower alkyl, e.g. methyl, ethyl, n-propyl isopropyl and the like, hydroxyl, etherified hydroxyl, such as lower alkoxy, e.g. methoxy, ethoxy and the like, esterified hydroxyl, such as lower alkoxy-carbonyloxy, e.g. methoxy-carbonyloxy, ethoxy-carbonyloxy and the like, lower alkanoyloxy, e.g. acetoxy, propionyloxy and the like, or halogeno, e.g. fluoro, chloro, bromo and the like, nitro, amino, particularly N,N-di-substituted amino, such as N,N-di-lower alkyl-amino e.g. N,N-dimethylamino, N,N-diethylamino and the like, etherified mercapto, such as lower alkyl-mercapto, e.g. methylmercapto, ethylmercapto and the like, halogeno-lower alkyl, e.g. trifluoromethyl and the like, whereby one or more than one of the same or of different substituents may be attached to any of the available positions.

When taken together, the radicals $R_1$ and $R_2$ may also represent a divalent aliphatic radical, particularly a lower alkylene radical, e.g. 1,4-butylene, 1,5-pentylene, 1,6-hexylene and the like, a lower oxa-alkylene radical, e.g. 3-oxa-1,5-pentylene and the like, a lower thia-alkylene radical, e.g. 3-thia-1,5-pentylene and the like, or a lower aza-alkylene radical, e.g. 3-aza-1,5-pentylene, 3-aza-3-methyl - 1,5 - pentylene, 3 - aza - 3-(2-hydroxyethyl)-1,5-pentylene, 3 - (2-acetoxyethyl) - 3-aza-1,5-pentylene and the like, as well as any other suitable, divalent aliphatic radical.

The group $R_3$ represents primarily an amino group of the formula —$NH_2$.

Whenever representing the group of the formula $$-NH-R_4$$

$R_4$ has the same meaning as either one of the previously described radicals $R_1$ and $R_2$. $R_4$ may also stand for an acyl radical, particularly the radical of an organic carboxylic acid, such as a lower aliphatic carboxylic acid, e.g. formic, acetic, propionic, pivalic, dichloroacetic, methoxyacetic, N,N-dimethylamino-acetic acid and the like, as well as malonic, succinic, maleic, malic acid and halfesters thereof, a carbocyclic aryl carboxylic acid, such as a monocyclic carboxylic acid, e.g. benzoic, 2-hydroxy-benzoic, 2-acetoxy-benzoic, 4-methoxy-benzoic, 3,4,5-trimethoxy-benzoic, 2-ethoxy-benzoic, 2,5-dichloro-benzoic, 4-bromo-benzoic, 3,N,N-dimethylamino-benzoic, 4-nitro-benzoic, 3-methyl-benzoic, phthalic, tetrahydrophthalic acid and the like, a monocyclic carbocyclic aryl-lower aliphatic hydrocarbon carboxylic acid, e.g. phenylacetic, diphenylacetic, dihydrocinnamic, cinnamic, 4-methoxy-cinnamic ferulic acid and the like, a heterocyclic carboxylic acid, particularly a monocyclic heterocyclic carboxylic acid, e.g. nicotinic, isonicotinic, thienoic, furoic, 3-(5-methyl-1,2-oxazolyl)-carboxylic acid and the like, or any other suitable carboxylic acid.

Each of the radicals $R_5$ and $R_6$ have the meaning given hereinabove for the radicals $R_1$ and $R_2$; one of them may also represent one of the previously mentioned acyl groups.

$R_7$ in the above formula represents primarily a lower alkylidene radical, e.g. methylidene, ethylidene, n-propylidene, isopropylidene, n-butylidene, secondary butylidene and the like. It may also stand for cycloalkylidene, which contains from five to seven ring carbon atoms, e.g. cyclopentylidene, cyclohexylidene and the like, cycloalkyl-lower alkylidene, in which cycloalkyl contains from five to seven ring carbon atoms, e.g. 2-cyclopentylethylidene, cyclohexylmethylidene and the like, carbocyclic aryl-alkylidene, such as monocyclic carbocyclic aryl-lower alkylidene, e.g. benzylidene and the like, or heterocyclic aryl-alkylidene, such as monocyclic azacyclic aryl-lower alkylidene, e.g. 2-pyridyl-methylidene, 4-pyridyl-methylidene and the like, monocyclic oxacyclic aryl-lower alkylidene, e.g. 2-furfurylidene and the like, or any other equivalent radical.

The anion $A^\ominus$ represents the anion of pharmaceutically acceptable acids, particularly of inorganic acids, such as mineral acids, e.g. hydrochloric, hydrobromic, hydriodic, sulfuric, phosphoric acids and the like, or organic carboxylic acids, e.g. acetic, propionic, glycolic, lactic, malonic, succinic, maleic, hydroxymaleic, dihydroxymaleic, fumaric, malic, tartaric, citric, benzoic, cinnamic, mandelic, salicylic, 4-aminosalicylic, 2-phenoxybenzoic, 2-acetoxybenzoic, and the like, or of organic sulfonic acids, e.g. methane sulfonic, ethane sulfonic, 2-hydroxyethane sulfonic, benzene sulfonic, toluene sulfonic acid and the like.

Due to the presence of at least one asymmetric carbon atom, the compounds of the present invention may be obtained in the form of mixtures of racemates, racemates or antipodes.

The compounds of the present invention have a blocking effect on the sympathetic nervous system on the efferent side, i.e. between the central nervous system and the arteries, and thus produce an antihypertensive effect. They can, therefore, be used as anti-hypertensive agents to relieve hypertensive conditions, particularly of neurogenic, renal or essential nature, either as research tools or as therapeutic agents. They may also serve as valuable intermediates for the preparation of other, particularly of therapeutically, useful compounds.

Compounds showing especially useful antihypertensive properties are those of the formula:

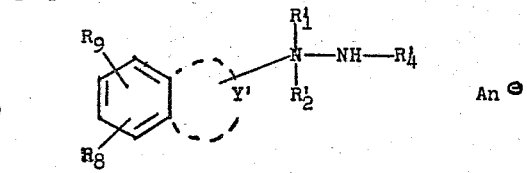

in which $Y'$ stands for 1,3-trimethylene, 1,4-tetramethylene or 1,5-pentamethylene, each of the radicals $R_1'$ and $R_2'$ represents lower alkyl, hydroxy-lower alkyl, allylic lower alkenyl, cycloalkyl containing from five to six ring carbon atoms, cycloalkyl lower alkyl, in which cycloalkyl contains from five to six ring carbon atoms, phenyl or phenyl-lower alkyl, $R_4'$ represents hydrogen, lower alkyl or lower alkanoyl, each of the radicals $R_8$ and $R_9$ attached to any of the available positions of the carbocyclic aryl nucleus, represents hydrogen, lower alkyl, lower alkoxy, lower alkyl-mercapto, N,N-di-lower alkyl-amino, halogeno or trifluoromethyl, and $An^\ominus$ represents the anion of a pharmaceutically acceptable acid.

This group of compounds may be represented by compounds of the formulae:

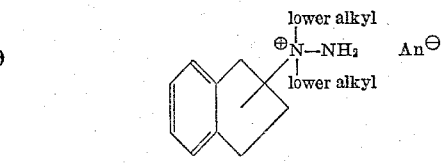

and

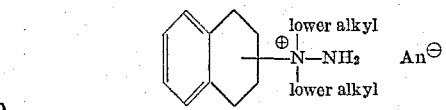

in which lower alkyl contains from one to four carbon atoms and $An^\ominus$ stands for the anion of a pharmaceutically acceptable acid.

The new compounds of this invention may be used in the form of pharmaceutical preparations, which contain the new quanternary compounds in admixture with a pharmaceutical organic or inorganic, solid or liquid carrier suitable for enternal or parenteral administration. For making up the preparations, there may be employed substances which do not react with the new compounds, such as water, gelatine, lactose, starches, stearic acid, magnesium stearate, stearyl alcohol, talc, vegetable oils, benzyl alcohols, gums propylene glycol, polyalkylene glycols or any other carrier useful for the manufacture of medicaments. The pharmaceutical preparations may be in solid form, for example, as capsules, tablets, dragees and the like, or in liquid form, for example, as solutions, suspensions, emulsions and the like. If desired, they may contain auxiliary substances such as preserving, stabilizing, wetting, emulsifying agents and the like, salts for varying the osmotic pressure or buffers, etc. They may also contain, in combinaation, other therapeutically useful substances.

The compounds of the present invention may be prepared, for example, by treating a compound of the formula:

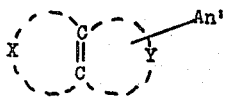

in which X and Y have the previously given meaning, and An' represents a reactive esterified hydroxy group capable of furnishing one of the anions of the formula $An^\ominus$, which has the previously given meaning, with a compound of the formula:

in which $R_1$, $R_2$ and $R_3$ have the previously given meaning, and, if desired, converting in a resulting hydrazinium compound the anion into a hydroxyl ion of the formula $OH^\ominus$, and/or, if desired, converting in a resulting hydrazinum compound the anion into the desired anion of the formula $An^\ominus$ having the previously given meaning, and/or, if desired, separating a mixture of isomeric compounds into the single isomers.

In the above starting materials the reactively esterified hydroxyl group An' is represented primarily by a hydroxyl group esterified with a strong acid, such as a strong mineral acid, e.g. hydrochloric, hydrobromic, hydroiodic, sulfuric acid and the like, or a strong organic acid, e.g. p-toluene sulfonic acid and the like, or any other suitable strong acid.

The above reaction may be carried out, for example, in the presence of an inert solvent, such as, for example, a lower alkanol, e.g. methanol, ethanol and the like, a lower alkanone, e.g. acetone and the like, a halogenated lower alkane, e.g. chloroform and the like, an ether, e.g. 1,4-dioxane and the like, a monocyclic carbocyclic aryl hydrocarbon, e.g. benzene and the like, a carbocyclic acid amide, e.g. N,N-dimethylformamide and the like, acetonitrile, dimethyl sulfoxide, or any other suitable diluent. The formation of the desired products may occur at room temperature, but is facilitated by performing the reaction at an elevated temperature, if necessary, in a closed vessel under pressure, and/or the absence of moisture and/or in the atmosphere of an inert gas, e.g. nitrogen.

The starting materials may be prepared according to known methods. For example, in a compound of the formula:

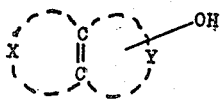

in which X and Y have the previously given meaning, the hydroxyl group may be converted into a halogeno atom (representing the reactive esterified hydroxyl group) by treatment of the hydroxy-compound with a halogenating reagent, such as, for example, with a phosphorus halide, e.g. phosphorus pentachloride, phosphorus tribromide and the like, with a thionyl halide, e.g. thionyl chloride, thionyl bromide and the like, or with any other suitable halogenating reagent, or with the esterifying acid itself, e.g. hydrobromic acid and the like. An iodine atom may be introduced, for example, by treatment of the corresponding chloro or bromo compound with an alkali metal iodide, e.g. sodium iodide and the like, in a suitable solvent, such as, for example, acetone and the like. A sulfonyloxy group, particularly the p-toluene sulfonyloxy group, representing the reactively esterified hydroxyl group, may be formed by treating the hydroxy compound with a sulfonic acid halide, e.g. p-toluene sulfonyl chloride and the like, preferably in the presence of an organic base, e.g. pyridine and the like.

Compounds of the present invention, particularly those of the formula:

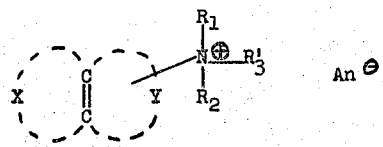

in which X, Y, $R_1$, $R_2$ and $An^\ominus$ have the previously given meaning, and $R_3'$ stands for one of the groups of the formula:

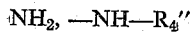

or

in which formulae each of the radicals $R_4''$, $R_5'$ and $R_6'$ represents aliphatic hydrocarbon, substituted aliphatic hydrocarbon, carbocyclic aryl or carbocyclic aryl-aliphatic hydrocarbon, and $R_5'$ and $R_6'$, when taken together, may stand for a divalent aliphatic radical, may also be prepared, for example, by treating a compound of the formula:

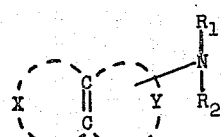

in which X, Y, $R_1$ and $R_2$ have the previously given meaning, with a compound of the formula:

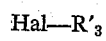

in which $R_3'$ has the previously given meaning, and Hal stands for halogen, and, if desired, converting in a resulting hydrazinium halide compound the halogen anion of the formula $Hal^\ominus$ into the hydroxyl anion of the formula $OH^\ominus$, and/or, if desired, converting in a resulting hydrazinium compound the anion into the desired anion of the formula $An^\ominus$ having the previously given meaning, and/or, if desired, converting a resulting mixture of isomers into the single isomers.

In the halogeno-amine reagents of the above formulae, Hal stands primarily for chloro, but may also represent fluoro or bromo. These reagents are prepared and used according to standard methods; for example, a mixture of gaseous chloramine and gaseous ammonia, generated by the gas-phase reaction of chlorine and an excess of ammonia, is passed into an excess of the amine or a solution thereof in an inert solvent, such as, for example, a monocyclic carbocycylic aryl hydrocarbon, e.g. benzene and the like, or any other suitable diluent. Other halogenoamino reagents may be used according to equivalent procedures.

The starting materials used in the above procedure may be prepared, for example, by reacting a compound of the formula:

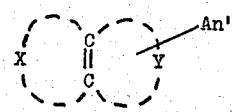

in which X, Y and An' have the previously given meaning, with a secondary amine of the formula:

in which $R_1$ and $R_2$ have the previously given meaning, and, if necessary, converting a resulting salt into the free compound. The reaction with the amine is preferably carried out in the presence of a solvent, such as, for example, a lower alkanol, e.g. methanol, ethanol, n-propanol, isopropanol and the like, a halogenated lower aliphatic hydrocarbon e.g. chloroform and the like, an ether, e.g. 1,4-dioxane and the like, a monocyclic carbocylic aryl hydrocarbon, e.g. benzene and the like, a formamide, e.g. N,N-dimethylformamide and the like, or any other suitable diluent. The reaction may occur at room temperature, but is preferably performed at an elevated temperature. In view of the volatility of certain secondary amines, particularly N,N-di-lower alkyl-amines, such as, for example, N,N-dimethylamine, N-ethyl-N-methylamine, N,N-diethylamine and the like, the replacement may be carried out in a sealed vessel under increased pressure. If necessary, an acid adsorbent metal or alkaline earth metal carbonate, e.g. sodium, potassium calcium carbonate and the like, may be added to the reaction mixutre to remove generated acid from the medium.

A further procedure for the preparation of compounds of this invention, particularly of those having the formula:

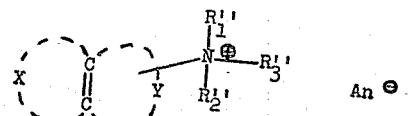

in which X, Y and $An^\ominus$ have the previously given meaning, $R_1''$ represents aliphatic hydrocarbon, substituted aliphatic hydrocarbon, carbocyclic aryl or carbocyclic aryl-aliphatic hydrocarbon, $R_2''$ represents aliphatic hydrocarbon, substituted aliphatic hydrocarbon or carbocyclic aryl-aliphatic hydrocarbon, and $R_3''$ represents one of the groups of the formulae:

$$-NH_2, \quad -NH-R_4$$

or

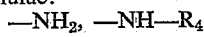

in which $R_4$ has the previously given meaning, $R_5''$ stands for acyl and $R_6''$ represents aliphatic hydrocarbon, substituted aliphatic hydrocarbon, carbocyclic aryl or carbocyclic aryl-aliphatic hydrocarbon, comprises reacting a compound of the formula:

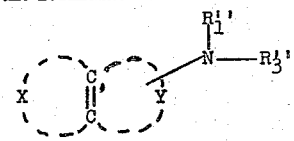

in which X, Y, $R_1''$ and $R_3''$ have the previously given meaning, with a reactive ester of an alcohol of the formula $R_2''$—OH, in which $R_2''$ has the previously given meaning, and isolating the desired compound, and, if desired, carrying out the optional steps.

This procedure is carried out according to known methods; reactive esters of the alcohol of the formula $R_2''$—OH are primarily esters with strong acids, particularly strong mineral acids, e.g. hydrochloric, hydrobromic, hydriodic, sulfuric acid and the like, or strong organic sulfonic acids, such as monocyclic carbocyclic aryl-sulfonic acids, e.g. p-toluene sulfonic acid and the like, or lower alkane sulfonic acids, e.g. methane sulfonic, ethane sulfonic, 2-hydroxyethane sulfonic acid and the like. Specific reagents which are very useful in the above reaction are, for example, lower alkyl halides, e.g. methyl, ethyl, n-propyl, isopropyl, n-butyl, isobutyl, or secondary butyl chloride, bromide or iodide and the like, lower alkenyl halides, e.g. allyl bromide, 2-methyl-allyl iodide and the like, di-lower alkyl sulfate, e.g. dimethyl sulfate, diethyl sulfate and the like, lower alkyl p-toluene sulfonate, e.g. methyl p-toluene sulfonate and the like, lower alkyl lower alkane sulfonate and the like, e.g. methyl or ethyl methane, ethane, 2-hydroxyethane sulfonate and the like, cycloalkyl halides, in which cycloalkyl contains, for example, from five to six ring carbon atoms, e.g. cyclopentyl bromide cyclohexyl chloride and the like, phenyl-lower alkyl halide, e.g. benzyl bromide, 2-phenylethyl choride and the like, or any other suitable reagent.

The reaction is preferably carried out in the presence of an inert solvent, such as lower alkanol, e.g. methanol, ethanol, n-propanol, isopropanol and the like, a lower alkanone, e.g. acetone and the like, a carbocyclic acid amide, e.g. N,N-dimethylformamide and the like, acetonitrile, or any other suitable diluent, under cooling, at room temperature or at an elevated temperature, and, if necessary, in closed vessel under pressure, and/or, in the absence of moisture, and/or, in the atmosphere of an inert gas, e.g. nitrogen.

The second nitrogen in the starting material may also react with the ester reagent used in the above procedure and a mixture of compounds may be formed; resulting mixtures may be separated into single compounds according to standard methods, based, for example, on physicochemical differences, e.g. solubility and the like.

The starting materials may be prepared, for example, by reacting a compound of the formula:

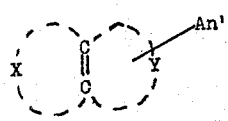

in which X, Y and An' have the previously given meaning, with a compound of the formula:

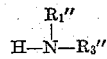

in which $R_1''$ and $R_3''$ have the previously given meaning, and, if desired, a resulting salt is converted into the free compound.

The reaction of the starting material with the hydrazine compound is preferably carried out in the presence of a solvent, such as, for example, a lower alkanol, e.g. methanol, ethanol, n-propanol, isopropanol and the like, a monocyclic carbocyclic hydrocarbon, e.g. benzene, toluene and the like, a halogenated lower aliphatic hydrocarbon, e.g. chloroform and the like, an ether, dioxane and the like, or any other suitable solvent, at room temperature, or preferably, at an elevated temperature, if necessary, in a closed vessel under pressure and/or, in the presence of an acid adsorbent; a metal or alkaline earth metal carbonate, e.g. soduim, potassium, calcium carbonate and the like, may be added to the reaction mixture to remove generated acid from the medium.

Resulting quaternary hydrazinium compounds may be converted into the corresponding quaternary hydrazinium hydroxides, for example, by reacting a quaternary hydrazinium halide with silver oxide, or a quaternary hydrazinium sulfate with barium hydroxide, by treating a quaternary hydrazinium salt with an anion exchanger, or by electrodialysis. From a resulting quaternary hydrazinium hydroxide, there may be obtained quaternary hydrazinium salts by reacting the base with acids, for example, those mentioned hereinbefore. A quaternary hydrazinium compound may also be converted directly into another quaternary hydrazinium salt without the formation of an intermediate quaternary hydrazinium hydroxide; for example, a quaternary hydrazinium iodide may be reacted with freshly prepared silver chloride to yield the quaternary hydrazinium chloride, or a quaternary hydrazinium iodide may be converted into the corresponding chloride by treatment with hydrochloric acid in anhydrous methanol.

A salt of an intermediate compound may be converted into the free base, for example, by reaction with an alkaline reagent, such as aqueous alkali metal hydroxide, e.g. lithium hydroxide, sodium hydroxide, potassium hydroxide and the like, aqueous alkali metal carbonate, e.g. sodium or potassium carbonate or hydrogen carbonate and the like, ammonia, such as aqueous amomnia, ammonia in a lower alkanol, e.g. methanol, ethanol and the like, or any other suitable alkaline reagent, as well as an anion exchange resin.

Compounds of the present invention which contain more than one asymmetric atom, may be obtained in the form of mixtures of racemates. Such mixtures of racemates may be separated into individual racemic compounds, salts or the quaternary ammonium compounds thereof, using known methods, which may be, for example, based on physico-chemical differences, such as solubility, adsorbability and the like. Thus, mixtures of racemates may be separated by fractionate crystallization or any other suitable method.

Resulting racemates of hydrozinium compounds may be resolved into the antipodes, for example, by converting a racemate into the corresponding hydrazinium hydroxide compound, for example, according to one of the previously described procedures, then treating the resulting racemic hydrazinium hydroxide with an opticlly active form of an acid, such as, for example, 10-camphor sulfonic acid, mandelic acid, tartaric acid and the like, and separating the resulting mixture of quaternary ammonium salts into the optically pure isomers on the basis of physico-chemical differences, e.g. solubility and the like.

Racemic starting materials may also be resolved according to known methods and then reacted to form optically pure products.

The invention also comprises any modification of the process wherein a compound obtainable as an intermediate at any stage of the process is used as starting material and the remaining step(s) of the process is (are) carried out. It also includes any new intermediates, which may be formed in one of the procedures outlined hereinbefore.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 2-indanyl p-toluene sulfonate and 5 ml. of N,N-dimethyl-hydrazine in 25 ml. of ethanol is refluxed for three hours. The ethanol and the excess of N,N-dimethyl-hydrazine are evaporated under reduced pressure, ethanol is added to the residue and the crystalline material is filtered off. After recrystallization from water the N,N-dimethyl-N-(2-indanyl)-hydrazinium p-toluene sulfonate of the formula:

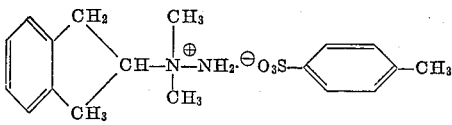

melts at 210°.

The starting material may be prepared as follows: To a solution of 5.0 g. of indan-2-ol in 25 ml. of pyridine is added over a period of ten minutes a total of 11.0 g. p-toluene sulfonyl chloride while keeping the temperature at about 25° with external cooling. After standing for several hours at room temperature, the mixture is poured into ice water and the crystalline material is filtered off. The resulting 2-indanyl p-toluene sulfonate is recrystallized from a mixture of acetone and ethanol and melts at 105–110°.

2-indanyl p-toluene sulfonate, when reacted with other N,N-disubstituted hydrazines, such as, for example, N-ethyl-N-methyl-hydrazine, N,N-diethyl-hydrazine, N,N-di-isopropyl-hydrazine and the like, according to the above-described procedure, yields N-ethyl-N-(2-indanyl)-N-methyl hydrazinium p-toluene sulfonate, N,N-diethyl-N-(2-indanyl)-hydrazinium p-toluene sulfonate, N-(2-indanyl)-N,N-di-isopropyl-hydrazinium p-toluene sulfonate and the like.

*Example 2*

To a solution of 12 g. 1-chloro-indane in 50 ml. of ethanol is added over a period of ten minutes 24 ml. of N,N-dimethyl-hydrazine. A spontaneous, exothermic reaction occurs, which is controlled by external cooling. The reaction mixture is allowed to stand overnight at room temperature; the ethanol and excess of N,N-dimethylhydrazine are evaporated under reduced pressure and the crystalline residue is collected on a filter with the help of diethyl ether. The N,N-dimethyl-N-(1-indanyl)-hydrazinium chloride of the formula:

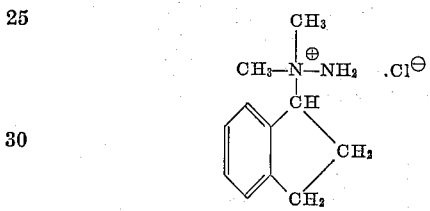

is recrystallized three times from ethanol, M.P. 175–178°.

The above-described quaternary hydrazinium chloride can be converted into the N,N-dimethyl-N-(2-indanyl)-hydrazinium hydroxide by treatment with silver oxide in ethanol; upon reaction with d-tartaric acid the N,N-dimethyl-N-(2-indanyl)-hydrazinium d-tartrate can be obtained.

*Example 3*

A mixture of 4.0 g. of the p-toluene sulfonic acid ester of 2-hydroxy-1,2,3,4-tetrahydro-naphthalene and 5 ml. of N,N-dimethyl-hydrazine in 25 ml. of ethanol is refluxed for five hours. The reaction mixture is evaporated to dryness under reduced pressure, the crystalline residue is collected with diethyl ether and recrystallized to yield the 2-[N-(N,N-dimethyl)-hydrazinium]-1,2,3,4-tetrahydro-naphthalene p-toluene sulfonate of the formula:

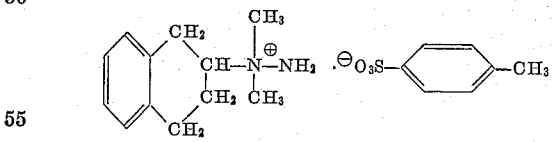

melting at 199–200°.

The N,N-dimethyl-hydrazine may be replaced by N-ethyl-N-methyl-hydrazine, N,N-diethyl-hydrazine, N-benzyl-N-methyl-hydrazine and the like; upon treatment with the p-toluene sulfonic acid ester of 2-hydroxy-1,2,3,4-tetrahydro-naphthalene according to the perviously described procedure, the 2-[N-(N-ethyl-N-methyl)-hydrazinium]-1,2,3,4-tetrahydronaphthalene p-toluene sulfonate, 2-[N-(N,N-diethyl)-hydrazinium]-1,2,3,4-tetrahydronaphthalene p-toluene sulfonate, 2-[N-(N-benzyl-N-methyl)-hydrazinium]-1,2,3,4-tetrahydronaphthalene p-toluene sulfonate and the like, can be obtained.

*Example 4*

A mixture of gaseous chloramine and ammonia, the latter in excess, is bubbled through a benzene solution of 2-N,N-dimethylamino-indane; the N,N-dimethyl-N-(2-indanyl)-hydrazinium chloride can be isolated from the reaction mixture.

The starting material may be prepared as follows: A mixture of 10.0 g. of 2-indanyl p-toluene sulfonate and a solution of 4.5 g. of N,N-dimethylamine in 50 ml. of ethanol is heated in a sealed tube at 100° for about six hours. The solution is concentrated under reduced pressure to a small volume, water is added, and the mixture is acidified with aqueous hydrochloric acid. The aqueous solution is extracted with ether, the organic layer is discarded, and the aqueous phase is made basic with aqueous ammonia. The organic material is extracted with ether, the ether phase is separated and evaporated, and the residue, containing the crude 2-N,N-dimethylamino-indane, is made slightly acidic with a 6 N solution of hydrogen chloride in ethanol. The crystalline 2-N,N-dimethylamino-indane hydrochloride is filtered off and recrystallized from ethanol, M.P. 212–215°. The free base of the above salt may be obtained by extracting an aqueous ammonia solution of the salt with diethyl ether, separating the organic layer and evaporating the solvent after washing with water and drying. The resulting 2-N,N-dimethylamino-indane can be used without further purification.

In the above reaction, 2-N,N-dimethylamino-indane may be replaced, for example, by 2-N,N-dimethylamino-1-phenyl-indane,
2-N,N-dimethylamino-2-methyl-indane,
1-benzyl-2-N,N-dimethylamino-indane,
5-chloro-2-N,N-dimethylamino-indane,
2-N,N-dimethylamino-5-methoxy-indane,
5,6-dimethoxy-2-N,N-dimethylamino-indane,
2-N,N-dimethylamino-4-methyl-indane,
2-N,N-dimethylamino-5-trifluoromethyl-indane and the like. When treated with chloramine as previously shown, these starting materials yield the desired N,N-dimethyl-N-[2-(1-phenyl)-indanyl]-hydrazinium chloride,
N,N-dimethyl-N-[2-(2-methyl)-indanyl]-hydrazinium chloride,
N,N-dimethyl-N-[2-(2-benzyl)-indanyl]-hydrazinium chloride,
N,N-dimethyl-N-[2-(5-chloro)-indanyl]-hydrazinium chloride,
N,N-dimethyl-N-[2-(5-methoxy)-indanyl]-hydrazinium chloride,
N,N-dimethyl-N-[2-(5,6-dimethoxy)-indanyl]-hydrazinium chloride,
N,N-dimethyl-N-[2-(4-methyl)-indanyl]-hydrazinium chloride,
N,N-dimethyl-N-[2-(5-trifluoromethyl)-indanyl]-hydrazinium chloride
and the like.

What is claimed is:
1. A compound of the formula:

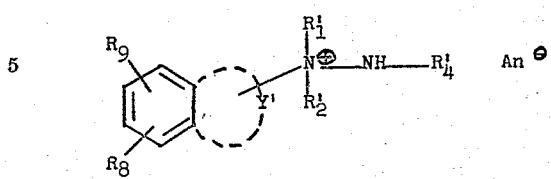

in which Y' stands for a member of the group consisting of 1,3-trimethylene, 1,4-tetramethylene and 1,5-pentamethylene, each of the radicals $R_1'$ and $R_2'$ represents a member of the group consisting of lower alkyl and phenyl-lower alkyl, $R_4'$ stands for the hydrogen, each of the radicals $R_8$ and $R_9$ represents a member of the group consisting of hydrogen, lower alkyl, lower alkoxy, halogeno and trifluoromethyl, and An⊖ represents the anion of a pharmaceutically acceptable acid.

2. The compound of the formula:

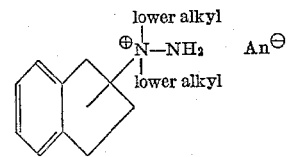

in which lower alkyl contains from one to four carbon atoms and An⊖ stands for the anion of a pharmaceutically acceptable acid.

3. N,N-dimethyl-N-(2-indanyl)-hydrazinium p-toluene sulfonate.
4. N,N-dimethyl-N-(1-indanyl)-hydrazinium chloride.
5. A compound of the formula:

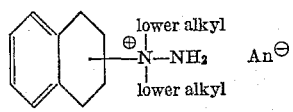

in which lower alkyl contains from one to four carbon atoms and An⊖ stands for the anion of a pharmaceutically acceptable acid.

6. N,N-dimethyl-N-[2-(1,2,3,4 - tetrahydro) - naphthyl]-hydrazinium p-toluene sulfonate.

References Cited in the file of this patent
UNITED STATES PATENTS
2,885,399    Omietanski _____ May 5, 1959

OTHER REFERENCES
Protiva et al.: "Chem. Listy," vol. 47, pages 1481 to 1485 and 1621 to 1632 (1953).
Biel et al.: J. Am. Chem. Soc., vol. 81, pp. 2805–13 (1959).